United States Patent
Kubota et al.

(10) Patent No.: US 7,449,255 B2
(45) Date of Patent: Nov. 11, 2008

(54) HIGH MOMENT DIRECTIONALLY TEXTURED SOFT MAGNETIC UNDERLAYER IN A MAGNETIC STORAGE MEDIUM

(75) Inventors: Yukiko Kubota, Pittsburgh, PA (US); Duane Clifford Karns, Valencia, PA (US); Kurt Warren Wierman, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 634 days.

(21) Appl. No.: 10/650,302

(22) Filed: Aug. 28, 2003

(65) Prior Publication Data

US 2004/0072036 A1 Apr. 15, 2004

Related U.S. Application Data

(60) Provisional application No. 60/414,576, filed on Sep. 30, 2002.

(51) Int. Cl.
*G11B 5/66* (2006.01)
(52) U.S. Cl. .................... 428/831.2; 427/131
(58) Field of Classification Search .......... 428/694 TM, 428/694 TS, 336, 900, 611; 427/131, 128
See application file for complete search history.

(56) References Cited

U.S. PATENT DOCUMENTS

| | | | | |
|---|---|---|---|---|
| 4,210,946 A * | 7/1980 | Iwasaki et al. | ............... | 360/131 |
| 4,677,032 A * | 6/1987 | Robinson | ............... | 428/611 |
| 5,589,262 A * | 12/1996 | Kiuchi et al. | ............... | 428/336 |
| 6,686,070 B1 * | 2/2004 | Futamoto et al. | ........ | 428/694 TS |
| 2002/0004148 A1 * | 1/2002 | Shimizu et al. | .......... | 428/694 T |
| 2002/0058159 A1 | 5/2002 | Kubota et al. | ............... | 428/694 |
| 2002/0058161 A1 | 5/2002 | Yamamoto et al. | .......... | 428/694 |
| 2002/0086184 A1 * | 7/2002 | Wu et al. | ............... | 428/694 |
| 2002/0118477 A1 | 8/2002 | Ikeda et al. | .......... | 360/55 |
| 2002/0127433 A1 * | 9/2002 | Shimizu et al. | ....... | 428/694 TM |
| 2003/0022023 A1 * | 1/2003 | Carey et al. | ......... | 428/694 MM |

FOREIGN PATENT DOCUMENTS

EP 093 838 B1 * 6/1990
JP 2002 269731 A1 9/2002

(Continued)

OTHER PUBLICATIONS

International Search Report for International Application No. PCT/US 03/26951, filed Aug. 28, 2003. Date of mailing: Dec. 18, 2003.

(Continued)

*Primary Examiner*—Holly Rickman
(74) *Attorney, Agent, or Firm*—Westman, Champlin & Kelly, P.A.

(57) ABSTRACT

A magnetic recording medium for communication with a transducer moving relative to the recording medium along a line of relative transducer motion. The magnetic recording medium has a substrate with a substrate surface, and a seed layer on the substrate surface. The magnetic recording medium also has a soft magnetic underlayer on the seed layer. The soft magnetic underlayer includes a magnetic material having a magnetic moment larger than 1.7 teslas. The soft magnetic underlayer has a texture that provides a magnetic easy axis that has an easy axis alignment parallel to the line of relative transducer motion. A magnetic storage layer is on the soft magnetic underlayer.

3 Claims, 12 Drawing Sheets

FOREIGN PATENT DOCUMENTS

| | | |
|---|---|---|
| WO | WO 96/25734 | 8/1996 |
| WO | WO 99/24973 | 5/1999 |

OTHER PUBLICATIONS

"CoFe-IrMn Exchange-Coupled Soft Underlayers for Perpendicular Media," by H.S. Jung and W.D. Doyle, Fellow, IEEE, Sep. 2002, pp. 2015-2017 (with two page cover sheet entitled IEEE Transactions on Magnetics, Intermag Europe 2002).*

"Low noise multi-layered FeAlSi soft magnetic films for perpendicular magnetic recording media," by F. Nakamura, T. Hikosaka, and Y. Tanaka, Journal of Magnetism and Magnetic Materials 235 (2001) 64-67 (with two page cover sheet entitled journal of magnetism and magnetic materials, vol. 235, Nos. 1-2, Oct. 1, 2001).*

* cited by examiner

HIGH MOMENT DIRECTIONALLY TEXTURED SOFT MAGNETIC UNDERLAYER IN A MAGNETIC STORAGE MEDIUM

CROSS-REFERENCE TO RELATED APPLICATION

This application claims priority from U.S. Provisional Application No. 60/414,576 filed on Sep. 30, 2002 for inventors Yukiko Kubota, Duane C. Karns and Kurt W. Wierman and entitled "High Moment and Circumferentially Textured SUL."

FIELD OF THE INVENTION

The present invention relates generally to magnetic recording media, and more particularly but not by limitation to soft magnetic underlayers (SULs) in such media.

BACKGROUND OF THE INVENTION

When perpendicular recording is used for information storage on magnetic media, a soft magnetic underlayer (SUL) focuses magnetic flux from the write head (also called a transducer) into a recording layer. This enables higher writing resolution in the double layered perpendicular media with a SUL, compared to that in single layer perpendicular media without a SUL. The SUL material is magnetically soft with very low coercivity (less than a few Oersteds), and has high permeability. The saturation magnetization of the SUL needs to be large enough so that the flux from the write head can be entirely absorbed without saturating the SUL. Based on these requirements, appropriate head materials, such as permalloy, CoZrNb and FeAlN are chosen for the SUL.

However, from the playback (readback) performance point of view, the SUL is known to be a new noise source in addition to the recording medium noise due to the recording layer. This SUL generates noise which is attributed to domain wall motion in the SUL. The SUL noise is observed in the low frequency region in the readback spectrum and is also referred to as "spike noise" in the literature. An exemplary prior art SUL provides a large saturation magnetization, and softness of the SUL material, but no mechanism for suppressing domain wall formation and domain wall motion in the SUL is disclosed. The SUL is in a magnetically isotropic condition in the film plane. This structure is susceptible to magnetic perturbation from repetitive read/write operations during the lifetime of a HDD drive, and from strong magnetic fields existing in a HDD enclosure such as a spindle motor and a voice coil motor.

In order to suppress the SUL noise, complicated SUL fabrication processes and structure have been proposed. For example, domain wall pinning layers (CoSm) underneath a CoZrNb SUL have been used. The domain pinning layer can be anti-ferromagnetic such as IrMn, which requires an external magnetic field during the film deposition to bias the anti-ferromagnetic layer.

A large saturation magnetization of the soft magnetic underlayer is needed to ensure that the peak magnetic flux from the write head can pass through the soft magnetic underlayer without saturating the soft magnetic underlayer. With current-materials, if the thickness of the soft magnetic underlayer is increased to increase the saturation magnetization to the needed level by using a thicker underlayer or by adding additional multiple thick layers of SULs, then the surface roughness of the soft magnetic underlayer becomes so high that it is not compatible with the very narrow fly height of a high density read/write head. Readback noise is associated with the presence of domains in the soft magnetic underlayer, and this noise increases with increasing layer thickness and magnetization levels. Current low saturation moment soft magnetic underlayer arrangements are a barrier to increasing areal density in newer media designs.

A soft magnetic underlayer is needed that has a high saturation magnetization in combination with a low thickness and freedom from noise due to the presence of domains in the soft magnetic underlayer. Embodiments of the present invention provide solutions to these and other problems, and offer other advantages over the prior art.

SUMMARY OF THE INVENTION

Disclosed is a magnetic recording medium for communication with a transducer moving relative to the recording medium along a line of relative transducer motion.

The magnetic recording medium comprises a substrate having a substrate surface, and a seed layer disposed on the substrate surface. The magnetic recording medium also comprises a soft magnetic underlayer disposed on the seed layer. The soft magnetic underlayer comprises a magnetic material having a magnetic moment larger than 1.7 teslas. The soft magnetic underlayer has a texture that provides a magnetic easy axis that has an easy axis alignment parallel to the line of relative transducer motion. A magnetic storage layer is disposed on the soft magnetic underlayer.

Another aspect disclosed is a multilayer laminated soft magnetic underlayer structure. Still another aspect disclosed is a soft magnetic underlayer structure that is free of 90 degree and 180 degree domain walls.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
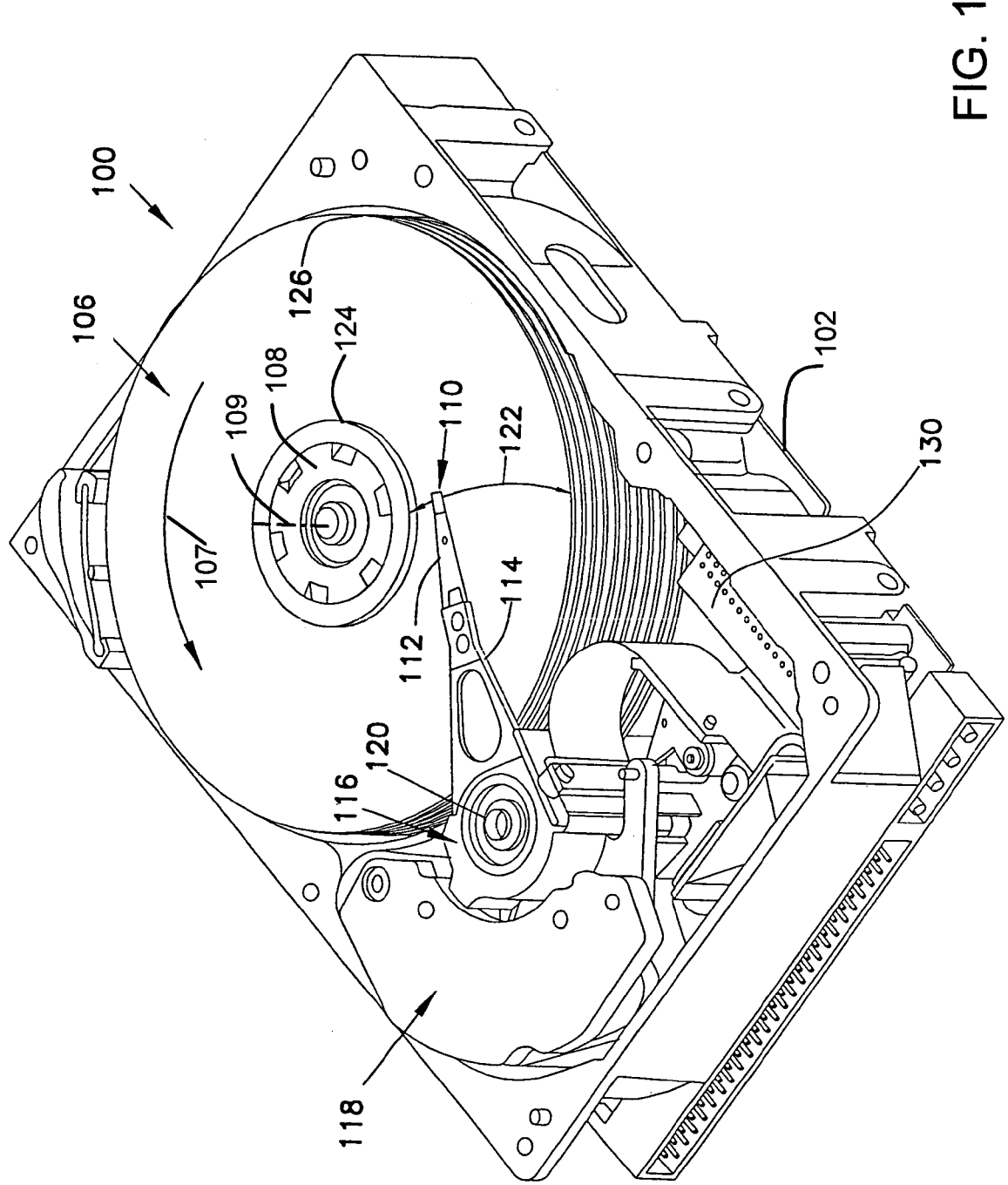
FIG. 1 is an oblique view of a disc drive.

In the embodiments described below, a seed layer is used to align a magnetic easy axis in a soft magnetic underlayer so that it is locally parallel to a line of relative transducer motion. The seed layer can comprise several layers to form a seed layer stack, in order to provide proper stress/strain state in the entire film stack in combination with possible heat cycling during subsequent medium fabrication processes. The soft magnetic underlayer is formed of a magnetic material, preferably an FeCo alloy, that has a high magnetic moment that is more than 1.7 teslas, and preferably at least 2.0 teslas. FeCo alloys exhibit the largest magnetic moment, at least 2.4 Teslas, among known materials in bulk phase. Use of the high magnetic moment material allows for a soft magnetic underlayer that is thin and has a low surface roughness that is desirable for high density magnetic recording. The parallel alignment of the magnetic texturing and the line of relative transducer motion reduces noise generation in the soft magnetic underlayer and improves signal-to-noise ratio and $PW_{50}$ during read operation of the read/write transducer. The texturing preferably forms closed loops in the soft magnetic underlayer, and is resistant to re-orientation by an externally applied magnetic field from a write operation or a stray field.

Read/write transducers and magnetic recording discs are usually arranged to use perpendicular magnetic recording to provide high areal density for information storage. When perpendicular magnetic recording is used in conjunction with a soft magnetic underlayer, the write element of the read/write transducer is generally designed to form a single-pole transducer. This single-pole write head (SPT head) records data by magnetizing a recording material in a magnetic recording layer in a direction that is perpendicular to the surface of the disc. A SPT head is a kind of inductive head with one of the pole widths significantly smaller than the other pole width to function as a single-pole writer. Recording (writing) magnetic flux flows through a closed circuit from the narrower single-pole head through the recording element in the magnetic recording layer and the soft underlayer on the medium, then back to the wider return pole of the head. Practically, this writing flux circuit makes the soft magnetic underlayer on the medium function as part of the writing head. The presence of the soft magnetic underlayer supports a sharp writing head field gradient which achieves high recording density.

A soft magnetic underlayer (SUL) is provided under the magnetic recording layer to reduce the large demagnetizing field from the pole formed on the bottom side of the magnetic recording layer. For the read back operation, the magnetoresistive (MR) type of read element is preferred over reading with an inductive read/write head, due to its high sensitivity to the perpendicular magnetic flux from the medium. The readback signal is enhanced when a soft magnetic underlayer is used in combination with a MR readback sensor.

As areal densities of magnetic disc designs increase, however, there are problems in implementing a soft magnetic underlayer due to limitations of the existing materials and processes used to make the soft magnetic underlayers. The existing soft magnetic underlayer is formed of a material that is magnetically soft with low coercivity and high permeability. A large saturation magnetization of the soft magnetic underlayer is needed to ensure that the peak magnetic flux from the write head can pass through the soft magnetic underlayer without saturating the soft magnetic underlayer. With existing materials, if the thickness of the soft magnetic underlayer is increased to increase the saturation magnetization to the needed level either by thicker material or increased number of lamination of the soft magnetic underlayer material, then the surface roughness of the soft magnetic underlayer becomes so high that it is not compatible with the very narrow fly height of a high density read/write head. Readback noise is associated with the presence of domains in soft magnetic underlayer, and this noise also increases with increasing layer thickness and magnetization levels.

A soft magnetic underlayer is needed that has a high saturation magnetization in combination with a low thickness and freedom from noise due to the presence of domains in the soft magnetic underlayer. Embodiments of the present invention provide solutions to these and other problems, and offer other advantages over the prior art.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head 110 (also called a slider or transducer) which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown).

Figure 2:
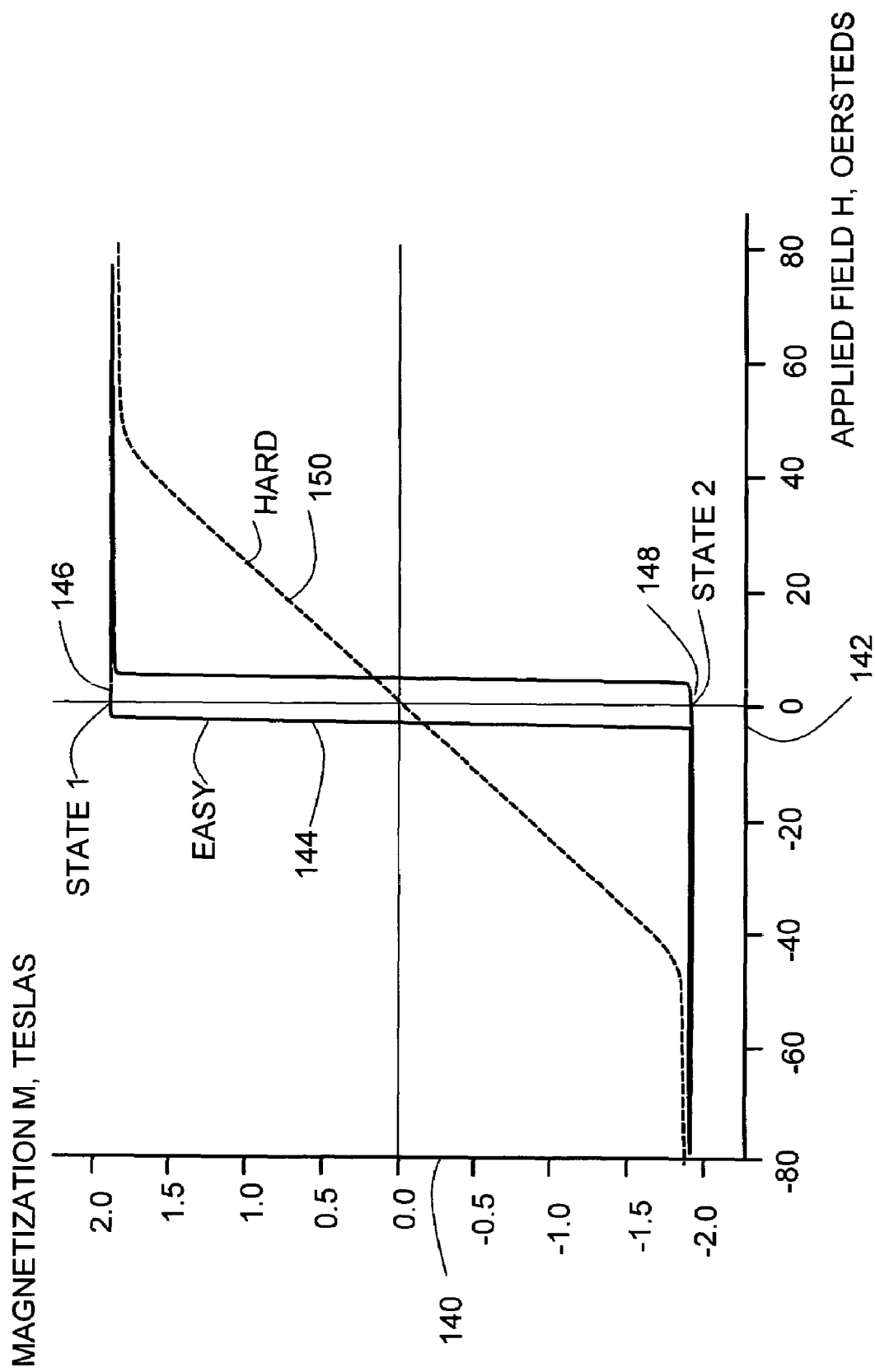
FIG. 2 illustrates M-H characteristic loops along a hard axis and an easy axis in the major plane of a magnetically textured soft magnetic underlayer film.

FIG. 2 illustrates M-H characteristic loops along a hard axis and an easy axis in the major plane of a magnetically textured soft magnetic underlayer film. At any selected location on the film, the hard axis is perpendicular to the easy axis. In FIG. 2, a vertical axis 140 represents magnetization M in teslas and a horizontal axis 142 represents an applied magnetic field in oersteds. When the applied field is oriented in a first direction (easy axis) in the major plane of the film, the M-H characteristic 144 is observed. When the field is applied along the easy axis, only a very small amount of applied field H is needed to magnetically saturate the film in either state 1 at 146 or state 2 at 148, depending on the polarity of the applied field H. Between the saturation states 1 and 2 along the easy axis, the film exhibits a high magnetic permeability, is easily magnetized by a small applied field, and serves well as a low reluctance return path for a read/write head. When the applied field is oriented in a second direction (a hard axis) in the major plane of the film, an M-H characteristic 150 is observed. When the field is applied along the hard axis, a larger amount of applied field H is needed to magnetically saturate the film, for either polarity of the applied field H. Between the saturation states of the M-H characteristic 150, the film exhibits a lower magnetic permeability, is weakly magnetized by a small applied field and serves poorly as a low reluctance return path for a read/write head.

Figure 3:
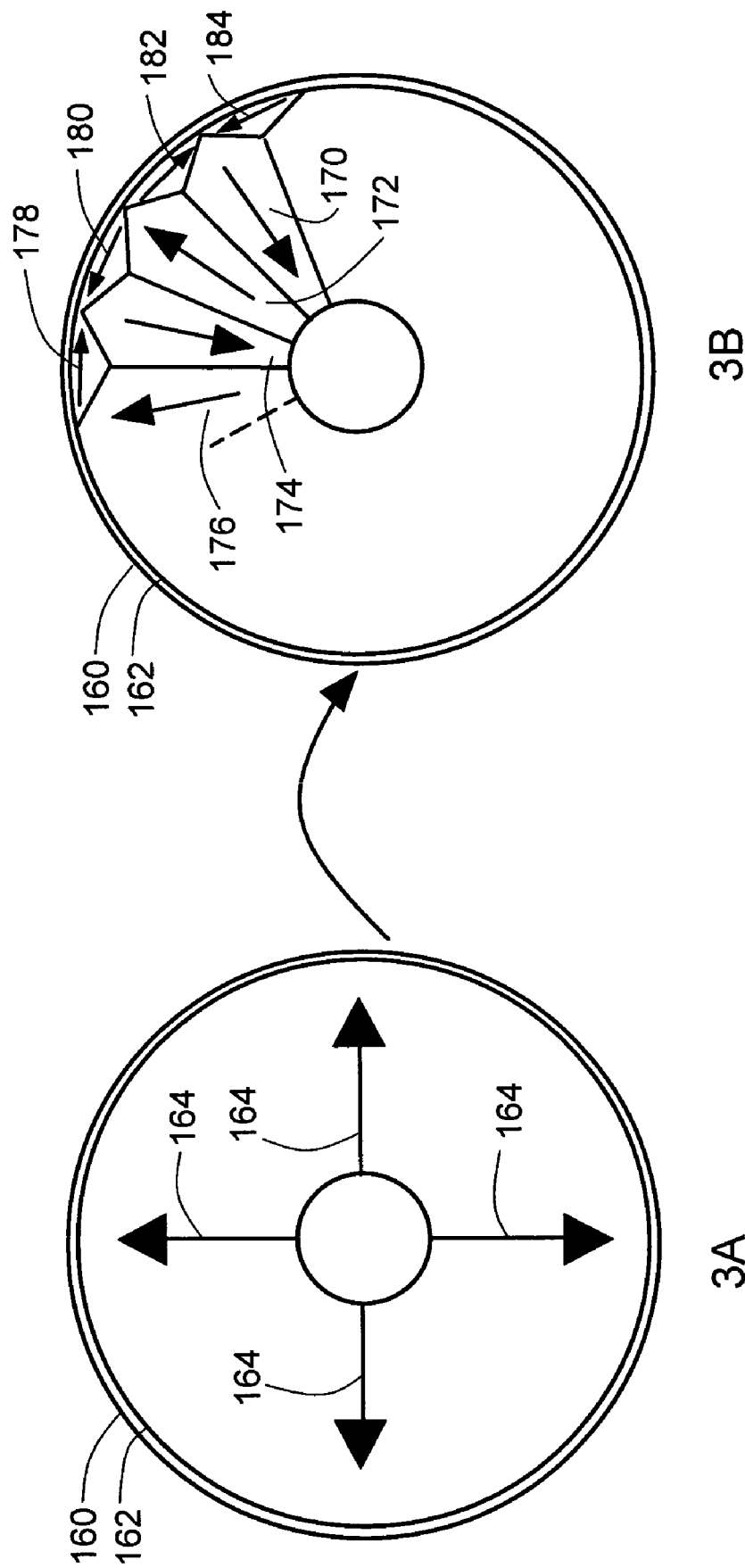
FIG. 3 schematically illustrates radial easy axis alignment and closure domains in a soft magnetic underlayer of a disc.

FIG. 3 schematically illustrates steps in preparing a radially textured soft magnetic underlayer 162 on a disc 160 in an effort to provide an easy axis that is oriented radially. A radial magnetic field, applied during manufacture of the soft magnetic underlayer 162, initially orients an easy axis 164 radially as illustrated at step 3A. However, when a stray magnetic field is applied, domains such as domains 170, 172, 174, 176, 178, 180, 182, 184 form as illustrated at step 3B. The domains 170, 172, 174, 176 have easy axes that are radially oriented as illustrated. However, closure domains 178, 180, 182, 184 also form along an outer edge and have easy axes that are oriented circumferentially as illustrated to form closed domain patterns.

Perpendicular magnetic recording media can use soft magnetic underlayers (SUL) such as the one illustrated at 3B, however, a read/write head will pick up undesired Barkhausen noise when domain walls in the soft magnetic underlayer 162 are subjected to stray magnetic fields during operation of a disc drive and/or other magnetic perturbations.

This soft magnetic underlayer 162 would have useful magnetic properties for use in a disc drive if the entire disc surface remained in a single remanent magnetic state without generating magnetic domain boundaries as illustrated at 3A. The magnetic state in the soft magnetic underlayer would be either at State 1 or State 2. This magnetization configuration, however, does not provide the minimum magnetic energy state due to the existence of free magnetic dipole moment, and relaxes into a lower energy state as illustrated at 3B, with closure domains 178, 180, 182, 184 at an outer edge of the disc 160. There are numerous domain walls formed between the domains on soft magnetic underlayer 162. This magnetic state relaxation can occur with about 10 oersteds of in-plane magnetic stray field from the read/write head. Hence a radially textured soft magnetic underlayer on a disc, in other words a soft magnetic underlayer that is textured so that the easy axis is perpendicular to a line of relative head motion, does not provide an optimum configuration for a soft magnetic underlayer.

Figure 4:
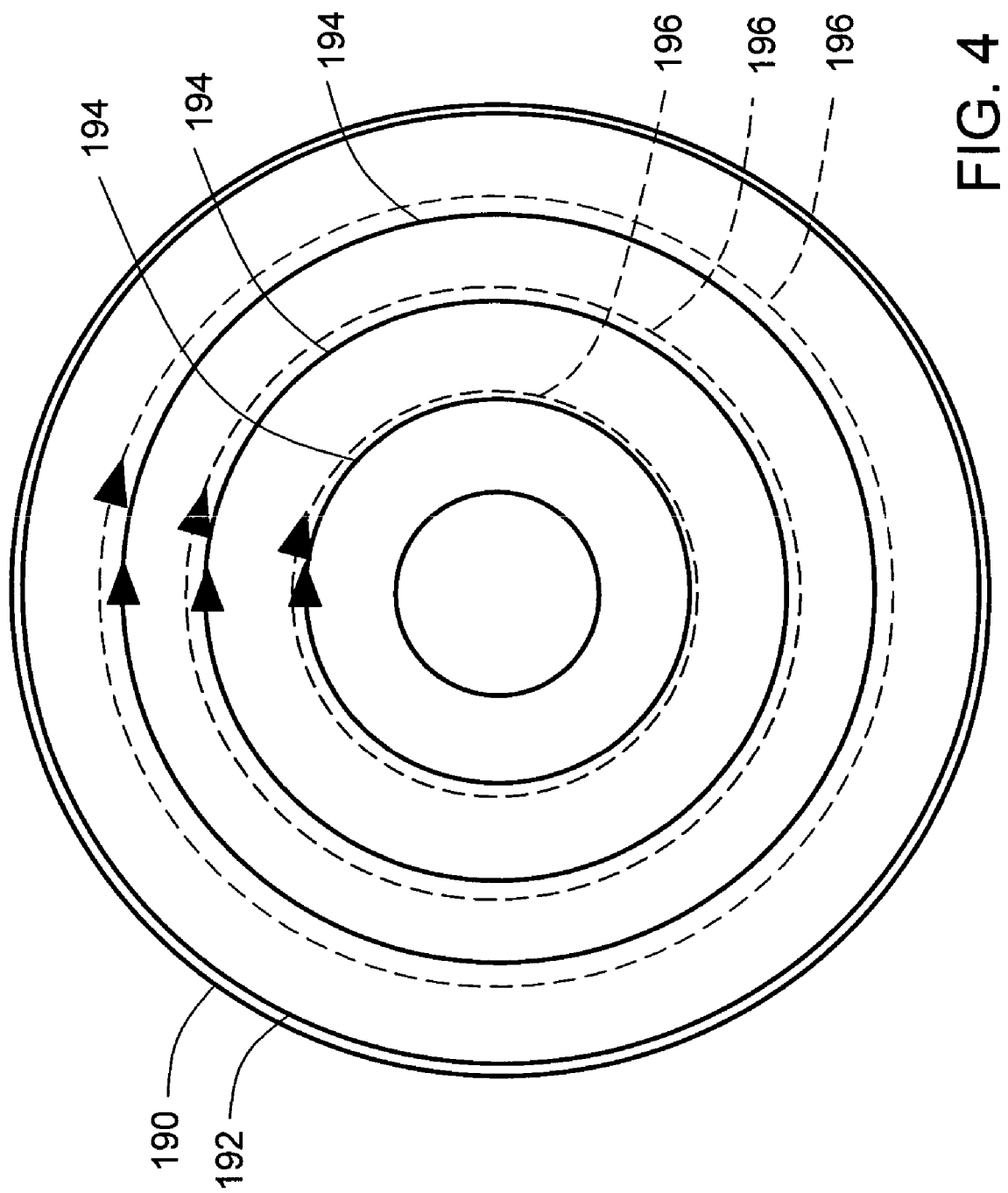
FIG. 4 schematically illustrates circumferential easy axis alignment in a soft magnetic underlayer of a disc.

FIG. 4 schematically illustrates circumferential easy axis alignment 194 in a circumferentially textured soft magnetic underlayer 192 of a disc 190. The circumferential easy axis 194 is in the same circumferential direction (clockwise for state 1, as illustrated, or counterclockwise for state 2) everywhere on the soft magnetic underlayer 192 and there are no 90° or 180° domain walls. The circumferential easy axes 194 follows continuous concentric circular paths around the disc that are unbroken by an edge of the soft magnetic underlayer 192. Domains and domain walls such as those illustrated in the radially textured soft magnetic underlayer 162 of FIG. 3 are not found in the circumferentially textured soft magnetic underlayer 192 of FIG. 4. The circumferentially textured soft magnetic underlayer 192 of FIG. 4 is in a low energy state and strongly resists formation of domain walls such as those illustrated in FIG. 3. Any domain walls that may form in soft magnetic underlayer 192 are formed parallel to the circumferential direction of the easy axes 194, and do not contribute transition noise to the readback signal. The domain configuration remains stable against transducer stray fields. The magnetic easy axis 194 of the film is circumferentially oriented in the plane of the disc, which is effective to reduce noise from soft magnetic underlayer 192 in a recording system.

A magnetic recording medium (not illustrated in FIG. 4) is deposited over the soft magnetic underlayer and communicates with a read/write transducer (not illustrated in FIG. 4) that moves relative to the disc 190 along a dashed line of relative transducer motion 196. The line of relative transducer motion is locally parallel to the easy axis 194. The movement of the transducer relative to the disc is typically produced by a combination of spinning the disc 190 and positioning the read/write transducer over a desired track on the disc, however, other combinations of read/write transducer motion and/or disc motion can be used to provide the desired relative motion between the read/write transducer and the disc 190.

Customary soft magnetic underlayer materials such as NiFe with Ni (40-50 at. %)—Fe polycrystalline alloy present a disadvantage when used in a circumferentially oriented soft magnetic underlayer. The NiFe alloy has a relatively low magnetic moment, which is 1.5-1.7 T. This low magnetic moment of NiFe results in a need for a soft magnetic underlayer thickness of about 200-400 nm for high density recording. This large thickness induces a large surface roughness on the soft magnetic underlayer, which interferes with use of small transducer-to-media spacing requirement for extremely high density recording.

To overcome this disadvantage, an alloy with a higher magnetic moment, on the order of 2-2.2 teslas, such as FeCo is preferred for the circumferentially textured soft magnetic underlayer 192. The soft magnetic underlayer 192 is preferably textured by using a seed layer to induce the texturing. This is explained in more detail below in connection with FIG. 5.

Figure 5:
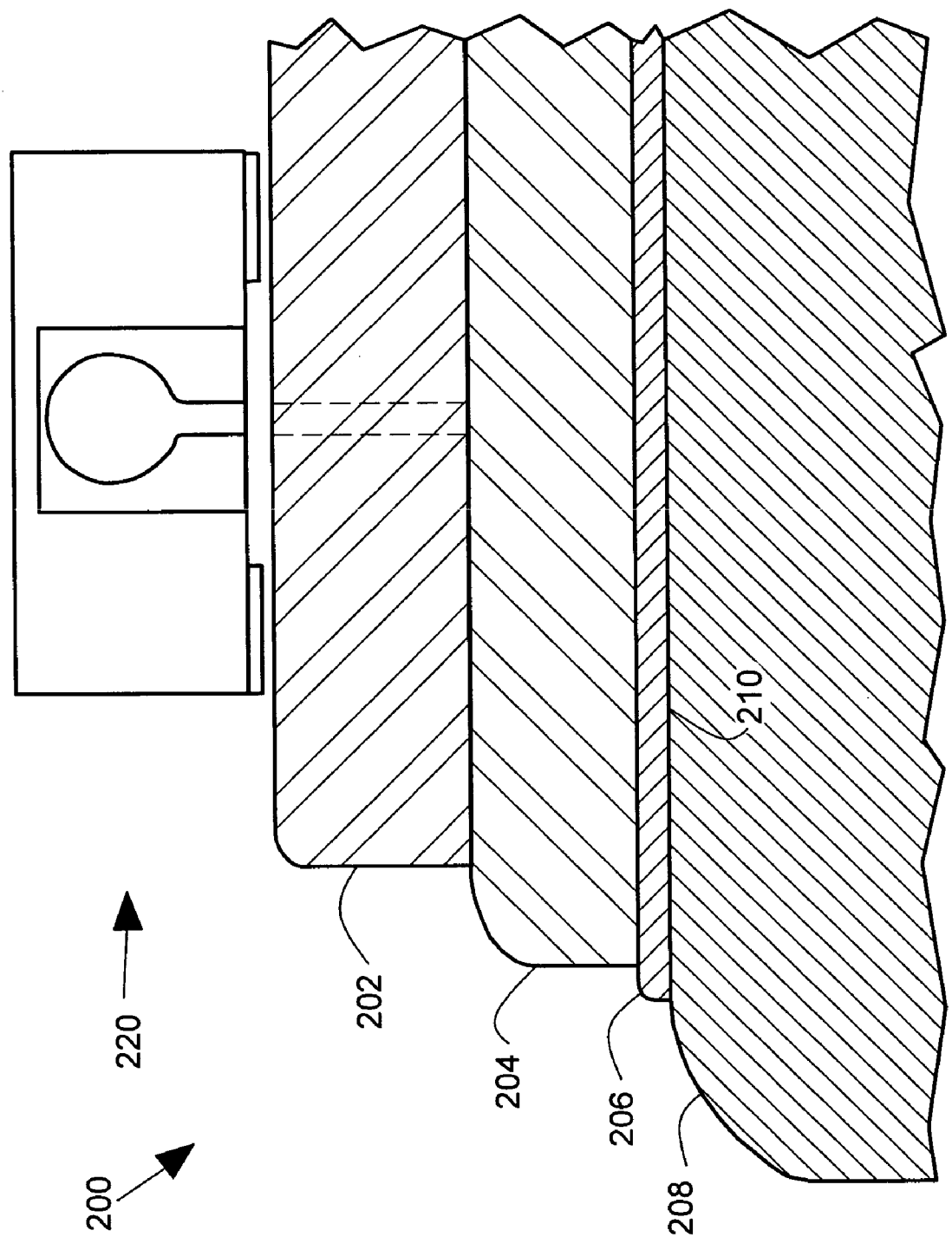
FIG. 5 schematically illustrates a cross sectional view of a perpendicular recording medium with a soft magnetic underlayer of textured, high magnetic moment, magnetic material on a seed layer.

FIG. 5 schematically illustrates a cross sectional view of a recording medium 200 with a magnetic storage layer 202, a soft magnetic underlayer 204 of textured, high magnetic moment, magnetic material, and a seed layer 206 on a substrate 208. The magnetic recording medium 200 communicates with a transducer 220 that moves relative to the recording medium 200 along a line of relative transducer motion, such as line 196 in FIG. 4.

The substrate 208 has a preferably planar substrate surface 210 that is adapted for deposition of subsequent layers. The substrate 208 can comprise, for example, a plate of aluminum with a nickel-phosphorus electroplating at substrate surface 210. Other known substrate materials can be used as well. In one preferred arrangement, the substrate 208 comprises a disc for use in a disc drive. In other preferred arrangements, the substrate 208 comprises a plate or cylinder.

The seed layer 206 is disposed on the substrate surface 210 as illustrated. The seed layer 206 is preferably a deposit of metal or metal alloy that has a textured seed layer surface that induces the texture of the soft magnetic underlayer 204. The seed layer 206 preferably comprises a seed layer material selected to reduce coercivity $H_C$ in the soft magnetic underlayer such as copper, copper alloy, ruthenium, permalloy, copper/iridium-manganese or tantalum-copper. The texturing of the seed layer 206 is arranged on a texturing path that is parallel to a path of relative motion between the recording medium 200 and the transducer 220. In the case of a disc, the texturing is circumferential.

The soft magnetic underlayer 204 is disposed on the seed layer 206. The soft magnetic underlayer 204 comprises a magnetic material having a magnetic moment larger than 1.7 teslas, and preferably at least 2.0 teslas. A magnetic material that comprises iron and cobalt is preferred, and more preferably about 65 at % Iron and 35 at % Cobalt. The soft magnetic underlayer 204 has a texture that provides a magnetic easy axis that has an easy axis alignment parallel to the line of relative transducer motion. The texturing preferably maintains the easy axis alignment in the presence of an externally applied field. The texturing preferably provides a magnetic hard axis that has a hard axis alignment that is perpendicular to the line of relative transducer motion. Alternatively, an external magnetic field can be used to establish the texture of the soft magnetic underlayer 204.

In one preferred arrangement, the substrate 208 comprises a disc and the easy axis alignment is circumferential over the disc. In another preferred arrangement, the substrate 208 comprises a drum or cylinder, and the easy axis alignment is circumferential over a round cylindrical surface of the substrate 208. In yet another preferred embodiment, the substrate 208 comprises a plate, and plate motion and/or transducer motion can be used to provide relative motion of a read/write transducer along an easy axis that follows a closed path over the plate. The soft magnetic underlayer 204 is preferably free of 90° and 180° domain walls that would otherwise promote Barkhausen noise.

The magnetic storage layer 202 is disposed on the soft magnetic underlayer 204. The magnetic storage layer 202 is preferably a perpendicular magnetic recording layer. The seed layer 206 and the soft magnetic underlayer 204 form a seeded double layer structure, where the seed layer has a preferable thickness of about 5 nanometers and the soft magnetic underlayer has a preferable thickness of about 50 nanometers. An example of the improvement in the performance provided by the seeded double layer is described below in connection with FIG. 6.

The thicknesses of various layers illustrated in FIG. 5 are not drawn to scale. It will be understood by those skilled in the art that that additional layers can be provided between the layers 208, 206, 204, 202 to improve adhesion or other performance characteristics. It is also understood that a layer such as a layer of diamond like carbon can be deposited on top of layer 202 to improve tribological characteristics. The layers 202, 204, 206 can be deposited using known thin film deposit on techniques.

Figure 6:
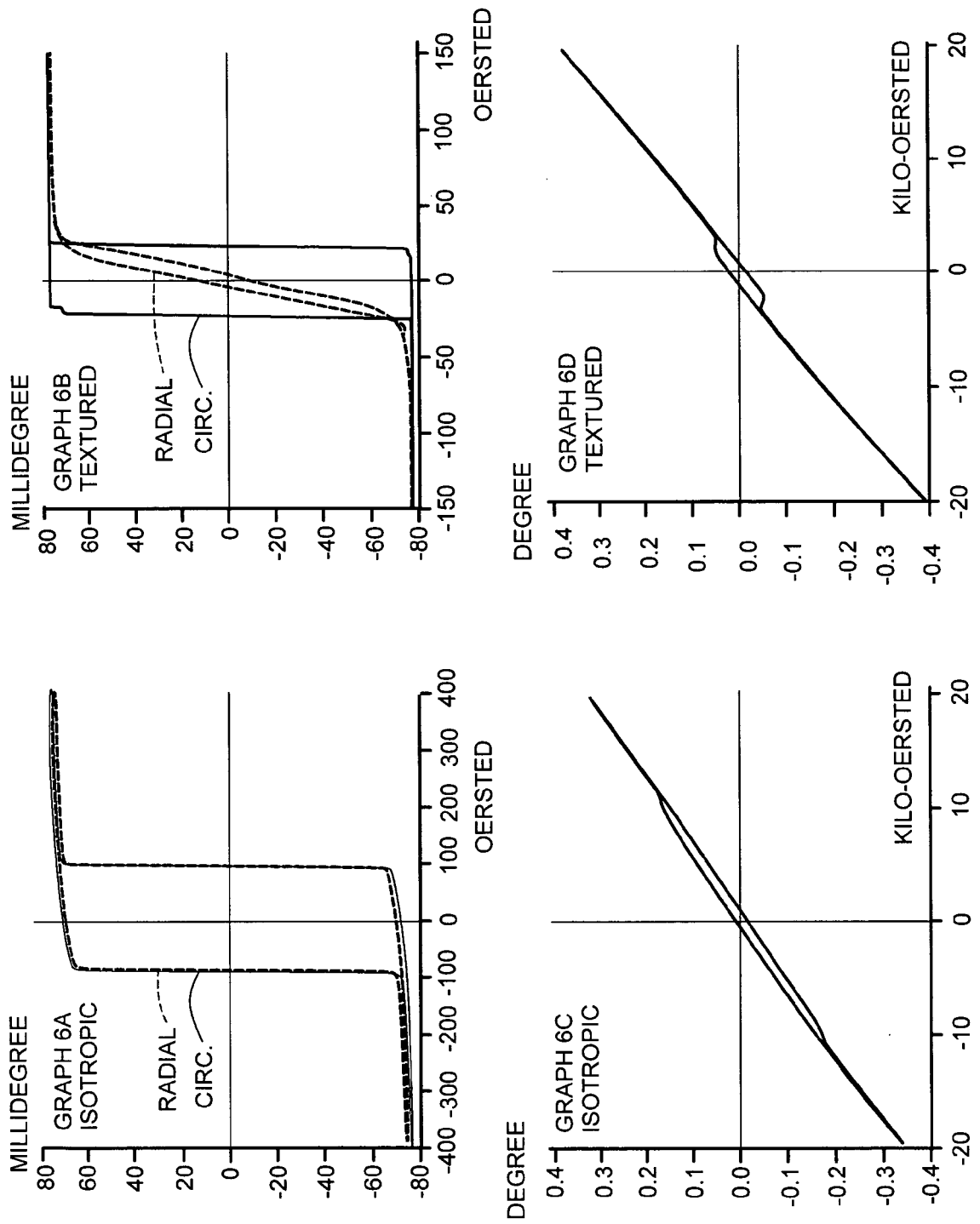
FIG. 6 illustrates comparable magneto-optic Kerr loops for an isotropic FeCo film and a textured FeCo film.

FIG. 6 illustrates graphs of magneto-optic Kerr loop data for a 50 nm thick FeCo film without a seed layer (Graphs 6A, 6C) and for a 50 nm thick FeCo film on a 5 nm thick seed layer of copper (Graphs 6B, 6D). Comparing the differing results shown in the Graphs 6A, 6B, 6C, 6D demonstrates the benefits of circumferential texture generation using a copper seed layer. In graphs 6A, 6B, the horizontal axes represent an applied field in oersteds and the vertical axes represent the resulting Kerr rotation in millidegrees. In graphs 6C, 6D, the horizontal axes represent an applied field in kilo-oersteds and the vertical axes represent the Kerr rotation in degrees.

The graph 6A shows in-plane results for an isotropic FeCo film (without a Cu seed layer). The graph 6B shows in-plane results for a circumferentially textured Cu/FeCo film. The graphs 6C and 6D are polar Kerr loops of each film which indicate significant magnetic easy axis confinement in the film plane in the Cu seeded film.

FIG. 6 presents the M-H loop shape comparison between a 50 nm thick FeCo single layer film and a 5 nm thick Cu seeded 50 nm thick FeCo film. The single layer FeCo films are magnetically isotropic in the thickness range of 10-200 nm with coercivity of 80-100 oersteds. The example of 50 nm thick film is shown in the graphs 6A and 6C. The Cu/FeCo film shown in the graphs 6B and 6D was produced in the identical process condition with the single layer FeCo film, except the presence of Cu seed layer. The film coercivity of the Cu seeded FeCo dropped to about 25 oersteds in the circumferential direction, and the typical hard axis loops with the saturation field of about 27 oersteds was observed. The significant decrease in the perpendicular M-H loop coercivity from graph 6C (FeCo) to graph 6D (Cu/FeCo) also indicates a stronger confinement of magnetic easy axis within the film plane for the Cu/FeCo.

Figure 7:
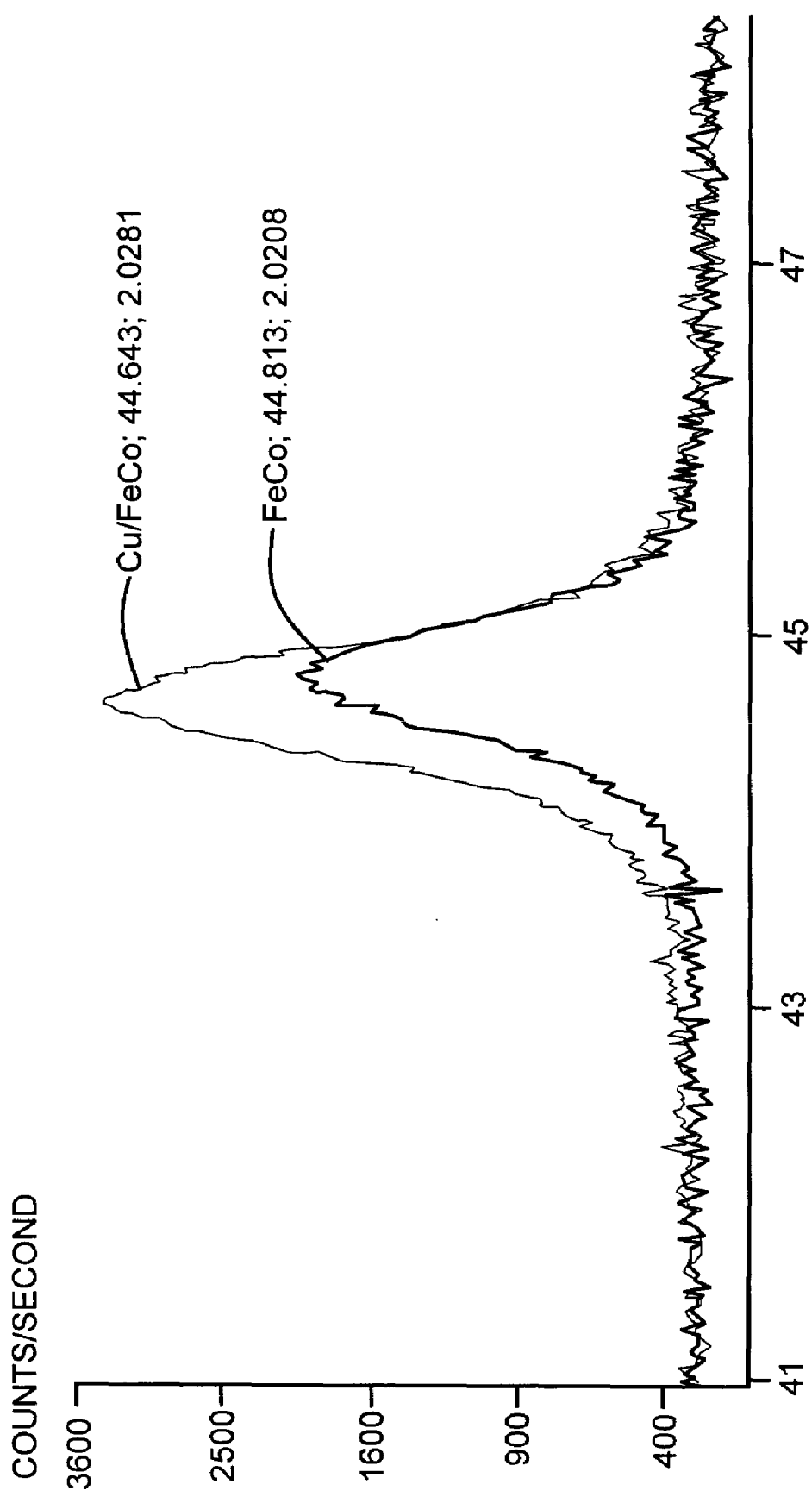
FIG. 7 illustrates comparable X ray diffraction (XRD) scans around a body centered cubic (BCC) (110) peak for an FeCo film and for an FeCo film with a Cu seed layer.

FIG. 7 illustrates X-ray diffraction (XRD) scans around a body-centered cubic (crystal orientation 110) peak for an FeCo film and an FeCo film with a Cu seed layer that are presented in FIG. 6. These film-normal theta-2theta XRD scans reveal only a single peak for each sample, which is close to the peak for bulk FeCo (BCC or B2) 110. The peak positions for the FeCo and Cu/FeCo films are 44.813 and 44.643, and the rocking curve full width at half maximum (FWHM) of the (110) peaks are 12.4 and 11.5, respectively. The (110) FeCo peak position shift in the Cu/FeCo sample indicates that the stress/strain state in the FeCo changed due to the presence of the Cu seedlayer.

Figure 8:
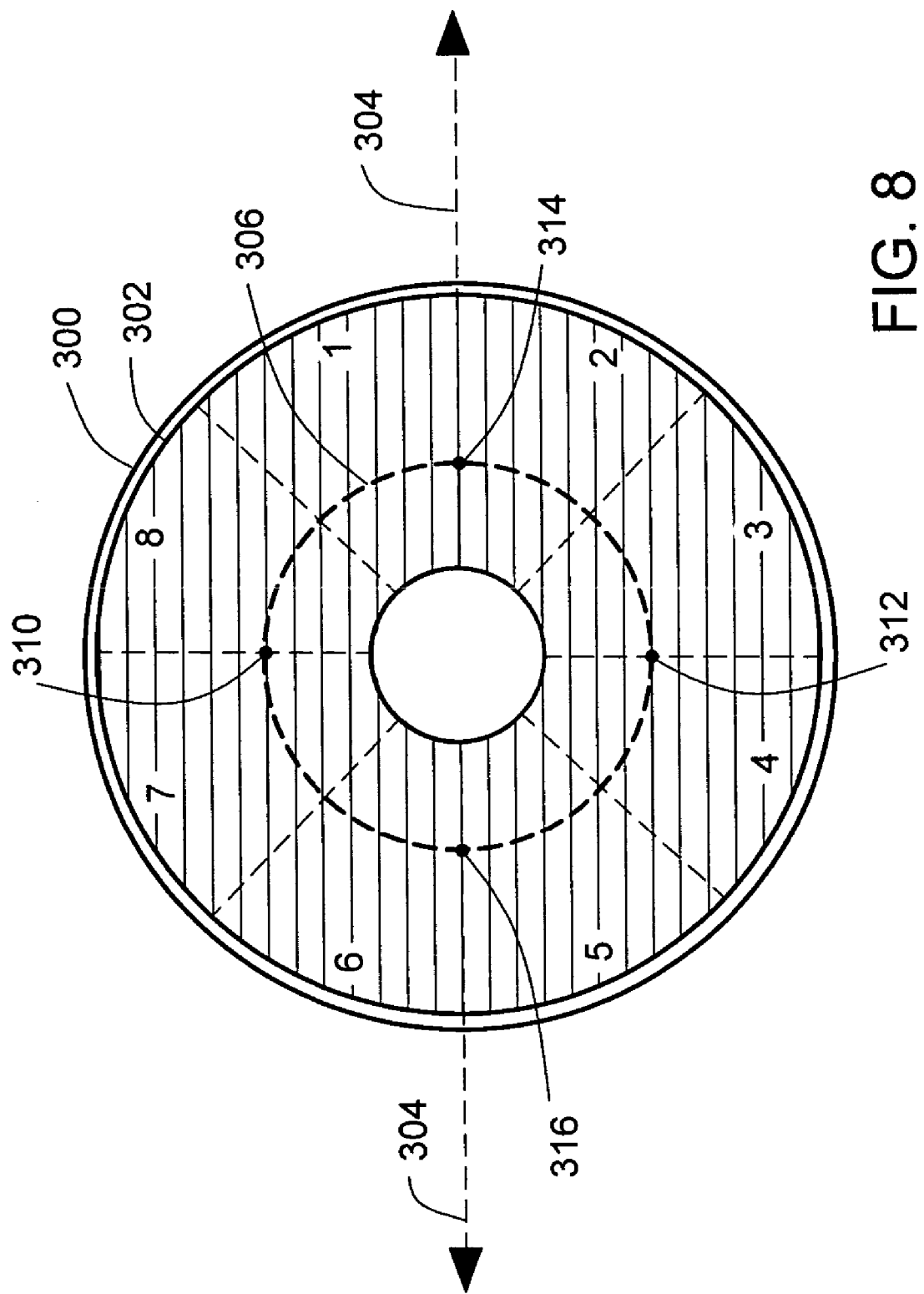
FIG. 8 schematically illustrates a disc with a uniaxially textured soft magnetic underlayer that can be used in noise analysis.

FIG. 8 schematically illustrates a magnetic recording disc 300 that includes a soft magnetic underlayer 302 with a uniaxial texture (preferred magnetic orientation). Disc sectors 1-8 are defined on the disc 300 as illustrated. Disc 300 includes a layer of perpendicular magnetic recording medium (not illustrated). The uniaxial texturing provides a method of measuring noise as a function of a varying alignment angle between a line of relative transducer motion 306 and an axis 304 of the uniaxial texturing. As the disc 300 is spun, a read/write transducer (not illustrated in FIG. 8) positioned on the line 306 experiences a full 360° variation in angle between the axis 304 (which is spinning with the disc) and a pole tip axis of the read/write transducer that is aligned parallel with the line 306. For example, when the read/write transducer is at locations 310, 312, the axis of texturing is aligned parallel with the pole tip axis. When the read/write transducer is at locations 314, 316, the axis of texturing is aligned perpendicular to the pole tip axis. The magnetic texture direction of the soft magnetic underlayer is more radial between sectors 3-4 and 7-8. The magnetic textured direction is more circumferential between sectors 1-2 and 5-6. As the disc is spun and data is read, differences in noise performance between the parallel (circumferential) and perpendicular (radial) alignments can be readily observed.

Two samples of discs 300 can be compared. In a first sample, the soft magnetic underlayer 302 is formed of a high moment (about 2 teslas) Co 70 at % —Ni 13 at % —Fe 17 at % (CoNiFe). In a second sample, the soft magnetic underlayer 302 is formed of a low moment (about 1 T) Fe 80 at % —Ni 20 at % (permalloy).

The hard axis saturation field of the first and second soft magnetic underlayer films 302 are around 18 and 5 oersteds, respectively. Generally about 40 oersteds of anisotropy field is needed to suppress noise. The low anisotropy fields of the samples are insufficient to suppress noise generated by the soft magnetic underlayer. The noise levels measured in the radially textured part on the samples provide a reference level for evaluating the noise level reduction present in the circumferentially textured part of the samples. Results of a noise evaluation are described below in connection with FIGS. 9-11.

Figure 9:
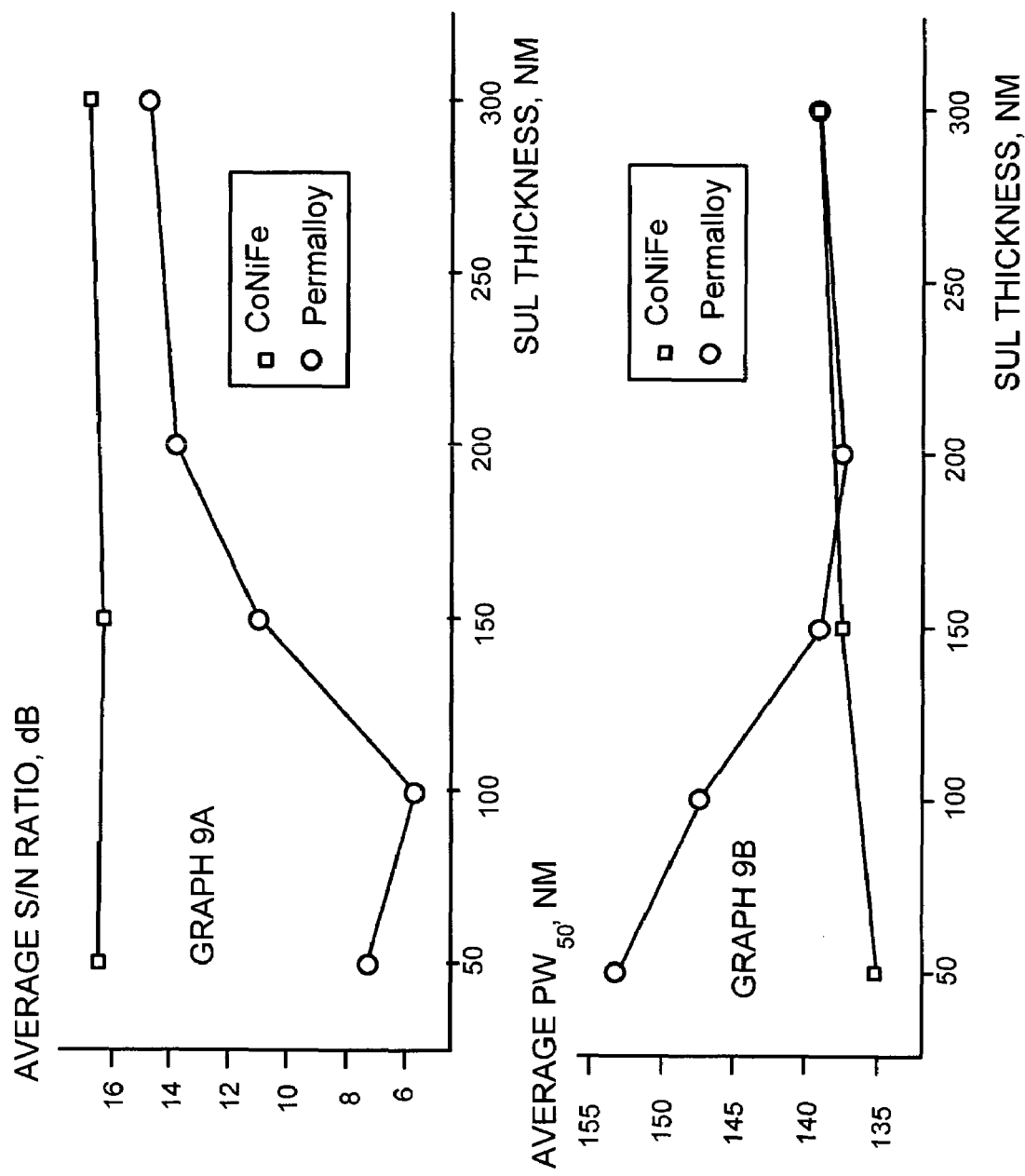
FIG. 9 illustrates average disc signal-to-noise ratio and average $PW_{50}$ of textured soft magnetic underlayers as functions of layer thicknesses.

FIG. 9 illustrates average disc performance of uniaxially textured SUL in the double layer perpendicular structure in Graphs 9A, 9B. In Graph 9A, a vertical axis represents an average signal-to-noise (S/N) ratio in decibels (dB) and a horizontal axis represents thickness of the soft magnetic underlayer in nanometers (nm). In Graph 9B, a vertical axis represents an average half amplitude pulse width ($PW_{50}$) in nanometers (nm) and a horizontal axis represents thickness of the soft magnetic underlayer in nanometers (nm). FIG. 9 presents the average disc performances of these soft magnetic underlayers in the double layer perpendicular media structure. Regardless of type of recording head design (SPT or conventional longitudinal recording head), both S/N ratio and $PW_{50}$ are constant for the CoNiFe over the thickness range, whereas thicknesses of more than 200 nm are needed for the low moment permalloy. Due to the fact that the signal amplitude remains constant for all films, the soft magnetic underlayer noise is the main factor to contribute the average S/N ratio.

Figure 10:
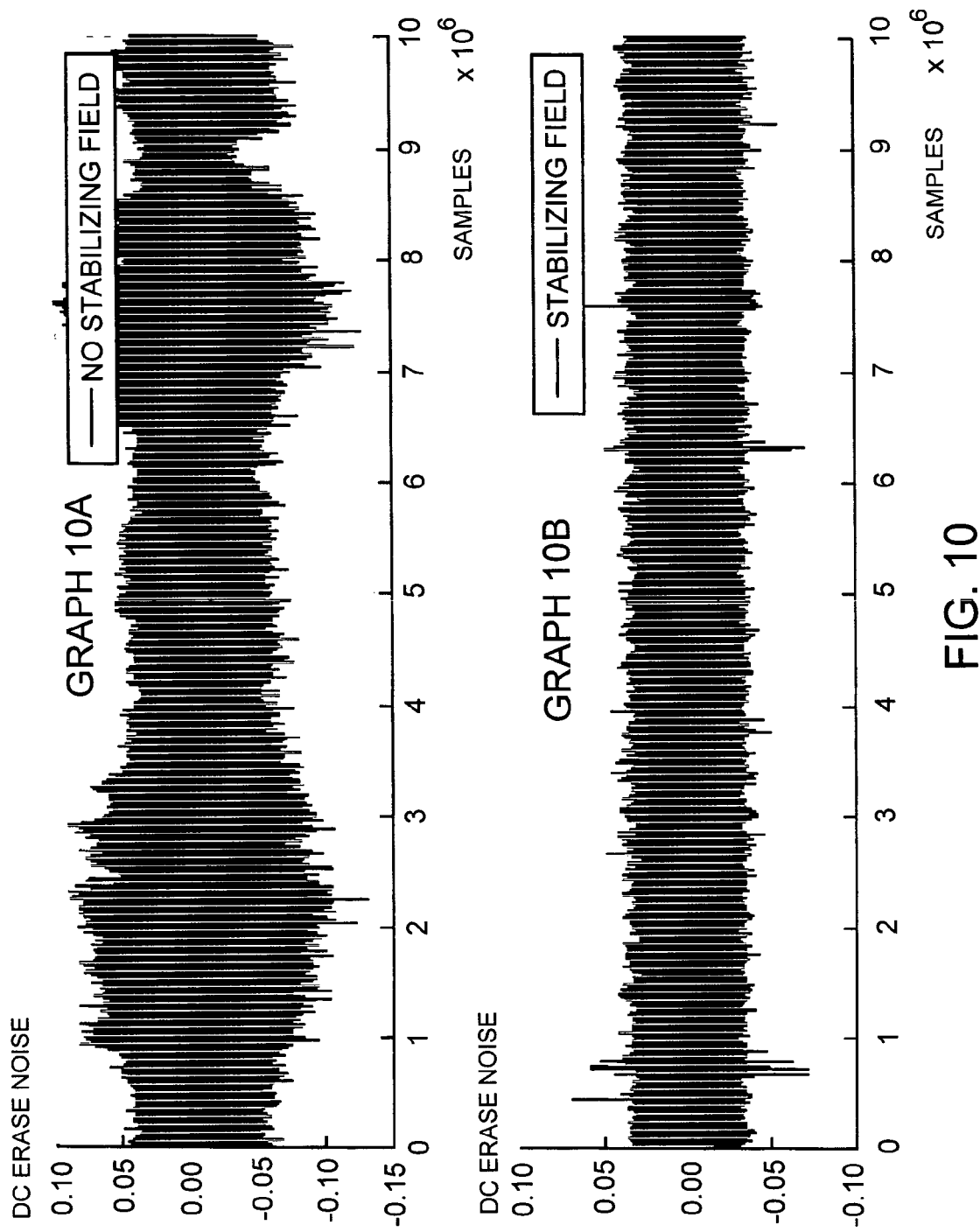
FIG. 10 illustrates comparable DC erase noise with and without a stabilizing field.

FIG. 10 illustrates DC erase noise when no stabilizing field is present (graph 10A) and when a stabilizing field is present (graph 10B). The vertical axes represent amplitude of DC erase noise and the horizontal axes represent sample numbers.

Figure 11:
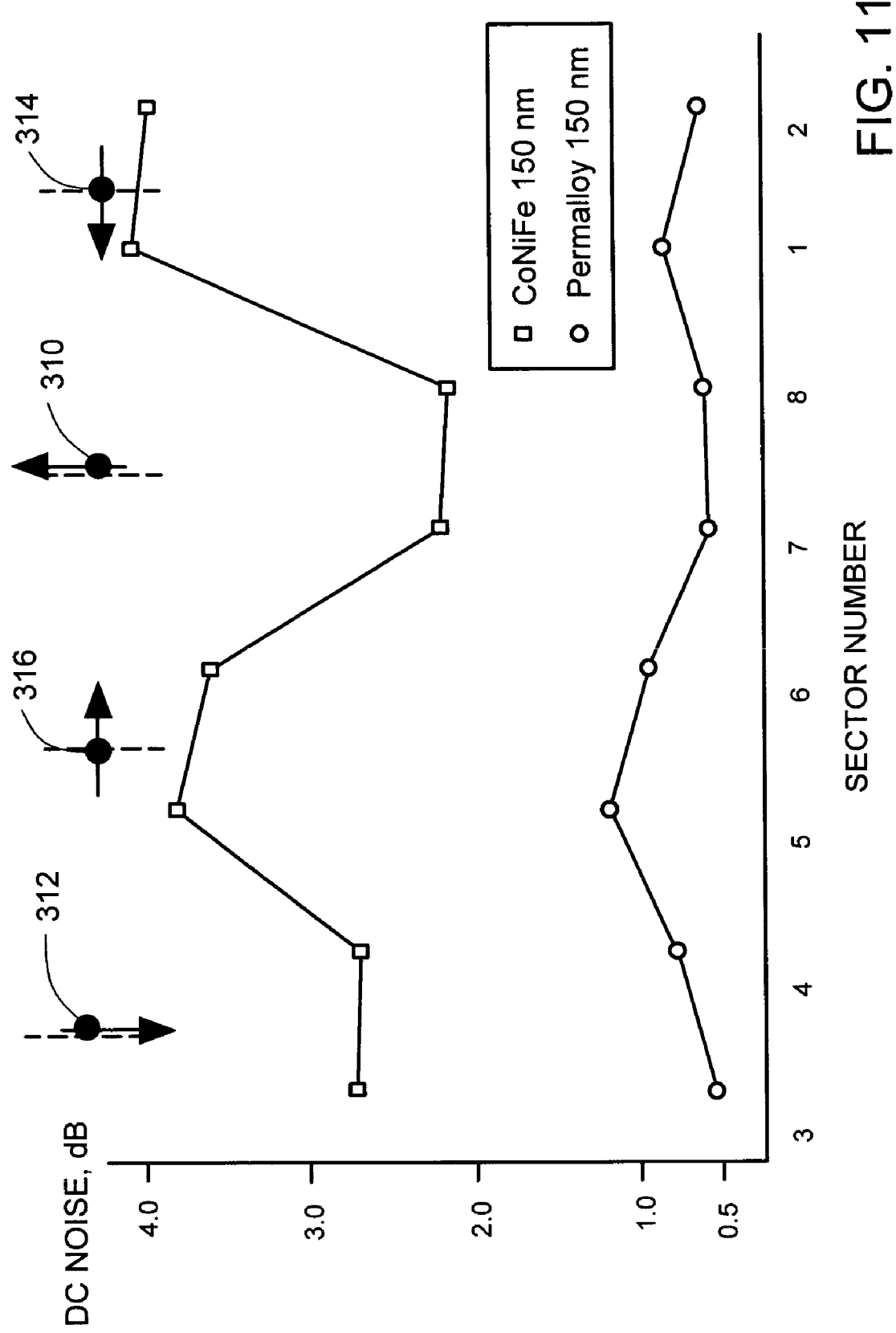
FIG. 11 illustrates DC erase noise as a function of angular alignment between texturing and a line of relative transducer motion.

FIG. 11 illustrates DC erase noise (measured using a spinstand) as a function of sector position as illustrated in FIG. 8. The noise amplitude in a full disc revolution shown in FIG. 11 demonstrates the two-fold symmetry, which is consistent with the presence of uniaxial magnetic texture in the SUL. The SUL noise modulation along the track can be eliminated by applying a small stabilizing magnetic field during the spinstand testing, which is a typical SUL noise behavior. The SUL noise captured during the first 500 microsecond period of each sector is plotted against the sector number in FIG. 11, which indicates the minima when the easy axis is parallel to the track direction (corresponding to points 310, 312 in FIG. 8) and the maxima when the easy axis is perpendicular to the track direction (corresponding to points 314, 316 in FIG. 8).

From the data presented in FIGS. 9-11, it can be seen that that larger magnetic moment enables better S/N ratio and better $PW_{50}$. FeCo alloy has the largest moment (2.4 T) among the materials tested for a soft magnetic underlayer: CoNiFe (about 2 T), permalloy (1 T), and NiFe (about 1.7 T). The proposed circumferentially textured SUL with FeCo is a preferred material to realize high recording density double layer perpendicular recording media.

Figure 12:
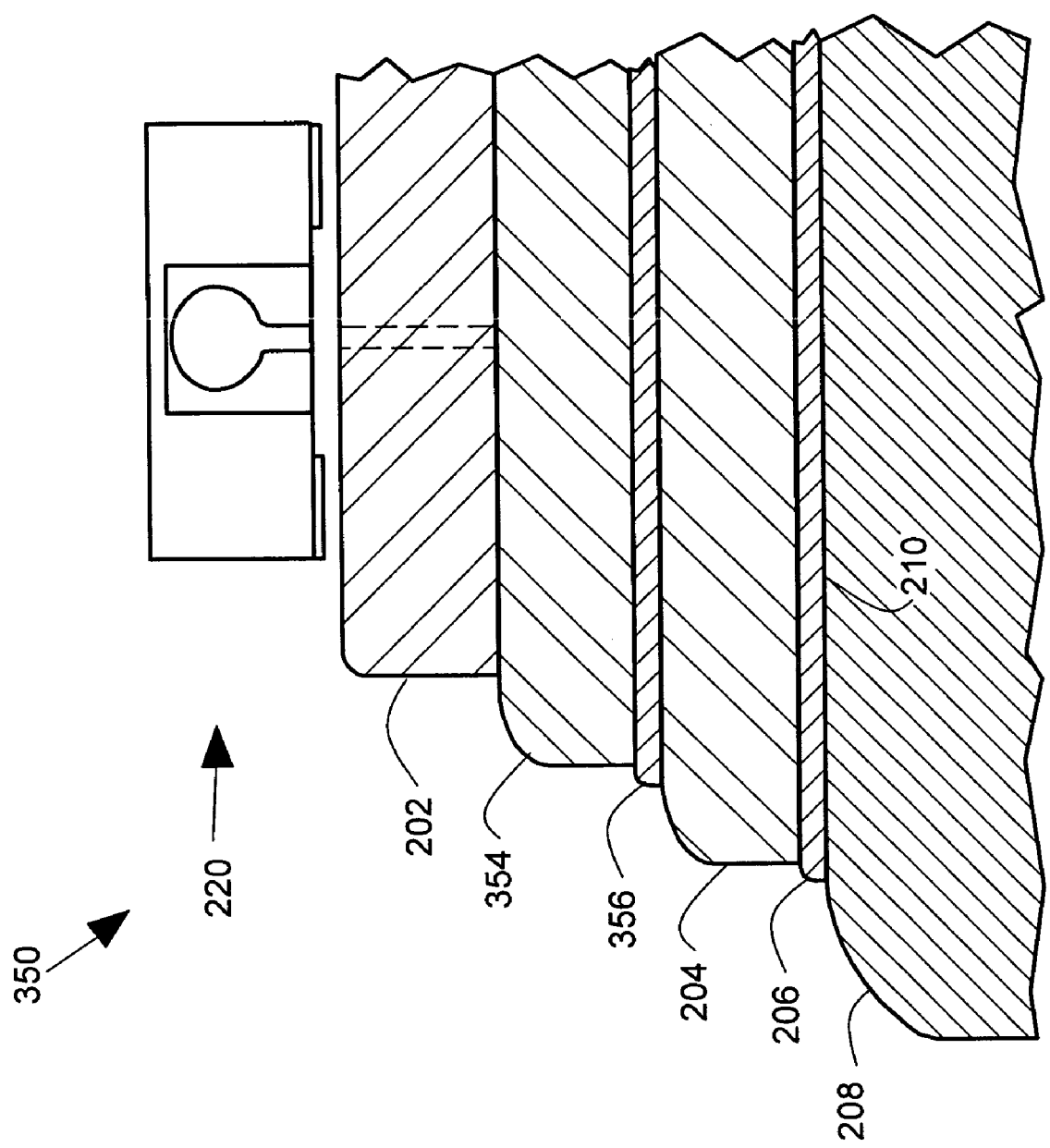
FIG. 12 schematically illustrates a cross sectional view of a perpendicular recording medium with multiple soft magnetic underlayers of textured, high magnetic moment, magnetic material on multiple seed layers.

FIG. 12 schematically illustrates a cross sectional view of a perpendicular recording medium 350 with multiple soft magnetic underlayers 204, 354 of textured, high magnetic moment, magnetic material on multiple seed layers 206, 356. FIG. 12 is similar to FIG. 5. Reference numbers used in FIG. 12 that are the same as reference numbers used in FIG. 5 identify the same or similar features. In FIG. 12, the second soft magnetic underlayer 354 is deposited on the second seed layer 356. The second seed layer 356 is deposited on the first soft magnetic underlayer 204. The arrangement shown in FIG. 12 provides a laminated soft underlayer and the number of laminations can be two (as illustrated) or more depending on the needs of the application. With multiple soft magnetic underlayers, soft magnetic underlayers can be sandwiched between seed layers to provide the desired mechanical stress/strain state in the entire laminated stack. In preferred arrangements, there are three to five soft magnetic layers with magnetic moment of about 1.7-1.8 Teslas, with each soft magnetic layer having a thickness about 50 nanometers. Preferably, the single lamination thickness is chosen to be thinner than a domain wall thickness for the soft underlayer material to avoid domain wall formation. Then, a number of laminations are chosen to be thick enough to carry the write magnetic flux without saturation.

In summary, a magnetic recording medium (such as 200) communicates with a transducer (such as 220) moving relative to the recording medium along a line of relative transducer motion. The magnetic recording medium comprises a substrate (such as 208) having a substrate surface (such as 210), and a seed layer (such as 206) disposed on the substrate surface. The magnetic recording medium also comprises a soft magnetic underlayer (such as 204) disposed on the seed layer. The soft magnetic underlayer comprises a magnetic material having a magnetic moment larger than 1.7 teslas. The soft magnetic underlayer has a texture that provides a magnetic easy axis that has an easy axis alignment parallel to the line of relative transducer motion. The magnetic record medium also comprises a magnetic storage layer (such as 202) disposed on the soft magnetic underlayer.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetic storage medium while maintaining substantially the same functionality without departing from the scope of the present invention. In addition, although the preferred embodiment described herein is directed to a disc drive system with a disc drive motor and a voice coil actuator, it will be appreciated by those skilled in the art that the teachings of the present invention can be applied to other types of magnetic media systems that provide a line of relative transducer motion that provide circular, non-circular, straight line or more complex patterns, without departing from the scope of the present invention.

What is claimed is:

1. A magnetic recording medium for communication with a transducer moving relative to the recording medium along a line of relative transducer motion, comprising:
    a substrate having a substrate surface;
    a seed layer disposed on the substrate surface;
    a soft magnetic underlayer disposed on the seed layer, the soft magnetic underlayer comprising a magnetic material having a magnetic moment larger than 1.7 Teslas, the soft magnetic underlayer having a texture that provides a magnetic easy axis that has an easy axis alignment parallel to the line of relative transducer motion;
    a magnetic storage layer disposed on the soft magnetic underlayer; and
    wherein the texturing maintains the easy axis alignment in the presence of an externally applied field.

2. A method of manufacturing a magnetic recording medium for communication with a transducer moving relative to the recording medium along a line of relative transducer motion, comprising:
    providing a substrate having a substrate surface;
    depositing a seed layer on the substrate surface;
    depositing a soft magnetic underlayer on the seed layer, the soft magnetic underlayer comprising a magnetic material having a magnetic moment larger than 1.7 teslas, the soft magnetic underlayer having a texture that provides a magnetic easy axis that has an easy axis alignment parallel to the line of relative transducer motion;
    depositing a magnetic storage layer on the soft magnetic underlayer; and
    selecting a seed layer material from the group: ruthenium, permalloy and tantalum-copper to reduce coercivity $H_C$ in the soft magnetic underlayer.

3. The method of claim 2 further comprising applying an external magnetic field to establishes the texture of the soft magnetic underlayer.

* * * * *

UNITED STATES PATENT AND TRADEMARK OFFICE
CERTIFICATE OF CORRECTION

PATENT NO.       : 7,449,255 B2
APPLICATION NO.  : 10/650302
DATED            : November 11, 2008
INVENTOR(S)      : Kubota et al.

It is certified that error appears in the above-identified patent and that said Letters Patent is hereby corrected as shown below:

Column 10, line 62, change "establishes" to --establish--.

Signed and Sealed this

Thirtieth Day of December, 2008

JON W. DUDAS
*Director of the United States Patent and Trademark Office*